United States Patent [19]

Hardesty et al.

[11] Patent Number: 5,494,338
[45] Date of Patent: Feb. 27, 1996

[54] VEHICLE DRIVE WHEEL

[75] Inventors: Terry D. Hardesty, Columbus; Brian D. Seegert, both of Hartford, Wis.; Jon M. Patterson, Mokena, Ill.

[73] Assignee: Deere & Company, Moline, Ill.

[21] Appl. No.: 265,304

[22] Filed: Jun. 24, 1994

[51] Int. Cl.$^6$ .................................................. B60B 27/00
[52] U.S. Cl. .................................... 301/64.7; 301/105.1
[58] Field of Search .............................. 301/64.7, 105.1, 301/111, 114, 117, 104

[56] References Cited

U.S. PATENT DOCUMENTS

| | | | |
|---|---|---|---|
| 2,871,647 | 2/1959 | Schrade et al. | 301/64.7 X |
| 4,330,914 | 5/1982 | Hood | 301/64.7 X |
| 4,930,843 | 6/1990 | Lewis | 301/64.7 |
| 5,116,106 | 5/1992 | Hardesty et al. | 301/105.1 |

FOREIGN PATENT DOCUMENTS 56-75201  6/1981  Japan ................................. 301/64.7

OTHER PUBLICATIONS

Deere & Co., brochure entitled "21–Inch Commercial Walk–Behind Mower", 4 pages, Dec. 1993, published in the U.S.A.
Deere & Co., brochure entitled "Walk–Behind Mowers", 4 pages, Dec. 1992, published in the U.S.A.
Ace Products, Inc., brochure entitled "Polyolefin Spoked Wheels", 1 page, 1994, published in the U.S.A.
Ace Products, Inc., brochure entitled "Drive Wheels on Parade", 1 page, 1994, published in the U.S.A.
Ace Products, Inc., brochure entitled "1203–12 and 1027–10 Industrial Wheel Assemblies", 1 page, 1994, published in the U.S.A.
Ace Products, Inc., brochure entitled "ACE–TUF Heavy Duty Industrial Wheel Assemblies", 2 pages, 1994, published in the U.S.A.
Ace Products, Inc., brochure entitled "8220–8 Wheel Assembly With Plastic Bushings, Metal Bushings, or Ball Bearings", 1 page, 1994, published in the U.S.A.
Deere & Co. photographs, copy of two photographs of Colson Caster Corp. metal wheel with metal gear and metal teeth, 1 page, 1994, published in the U.S.A.
Deer & Co. photographs, copy of two photographs of Schnell Gubh. plastic wheel with plastic gear and plastic teeth, 1 page, 1994, published in the U.S.A.
Deere & Co. photographs, copy of two photographs of Honda plastic wheel with plastic gear and plastic teeth, 1 page, 1994, published in the U.S.A.
Deere & Co. photographs, copy of two photographs of Colson Center Corp. plastic wheel with plastic gear and plastic teeth, 1 page, 1994, published in the U.S.A.

*Primary Examiner*—Russell D. Stormer

[57] ABSTRACT

A plastic composite drive wheel is provided for use with larger vehicles such as lawn and garden tractors and rear engine riders. The plastic wheel includes spoke segments formed in the inner and outer faces of the wheel, the segments radially alternating between the inner and outer faces. Molded into the plastic wheel is a powdered metal insert, the insert including spokes or fingers which extend into each plastic wheel spoke segment. The insert is adapted to be fixably received with the drive axle of a transmission for transmitting the torque to the plastic wheel.

11 Claims, 3 Drawing Sheets

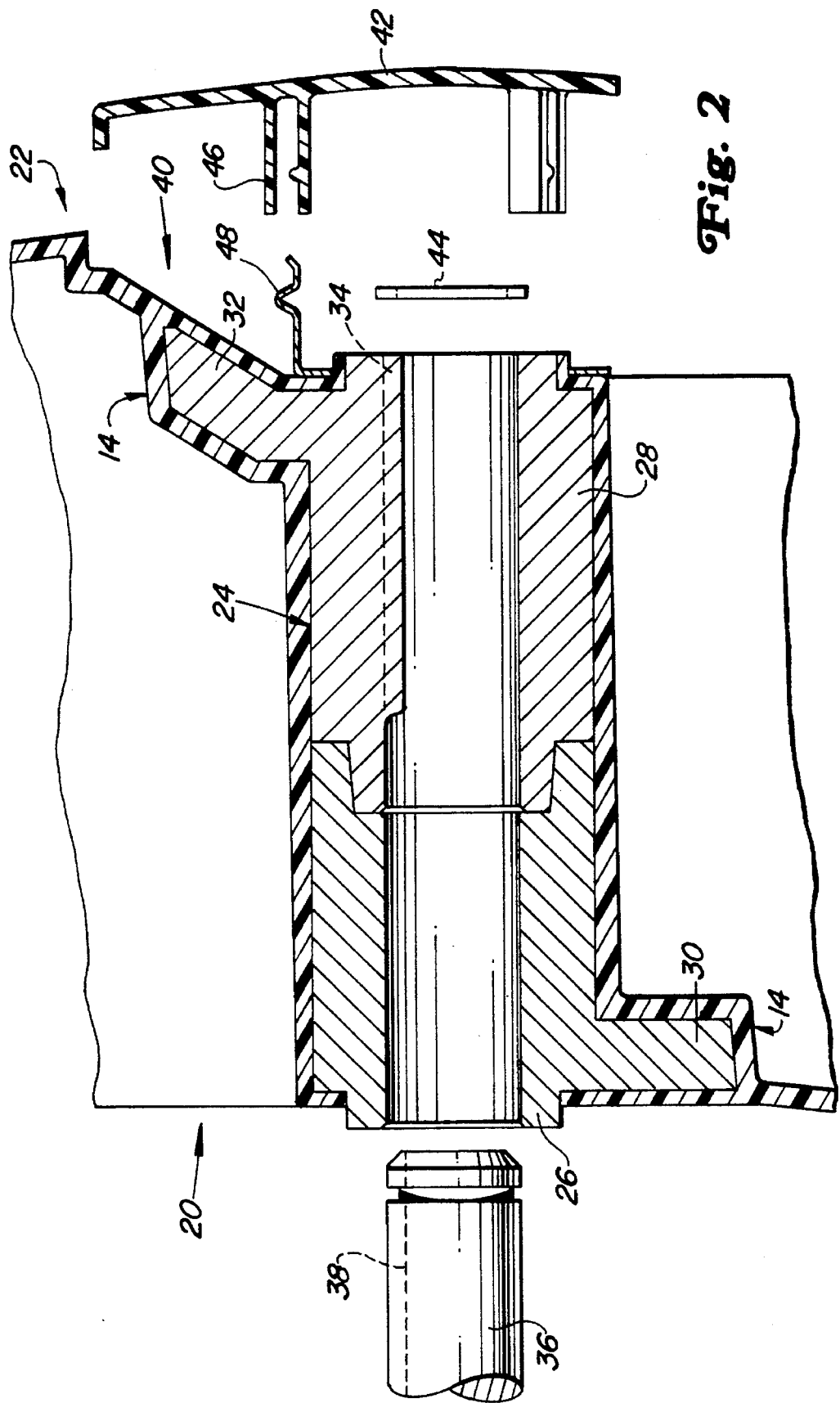

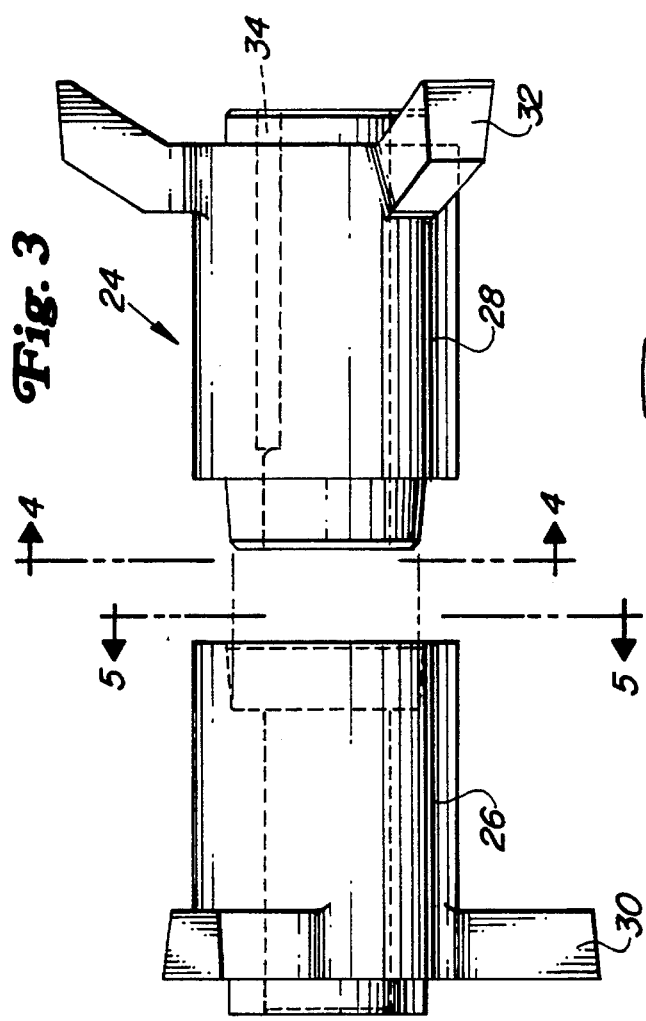
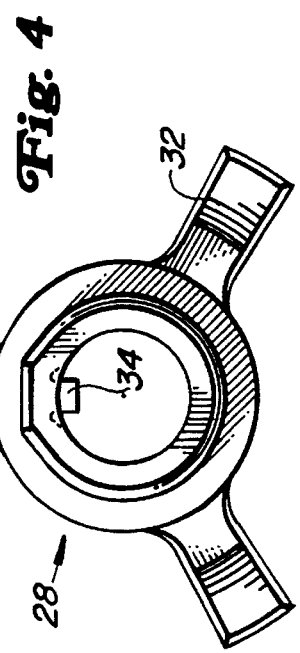
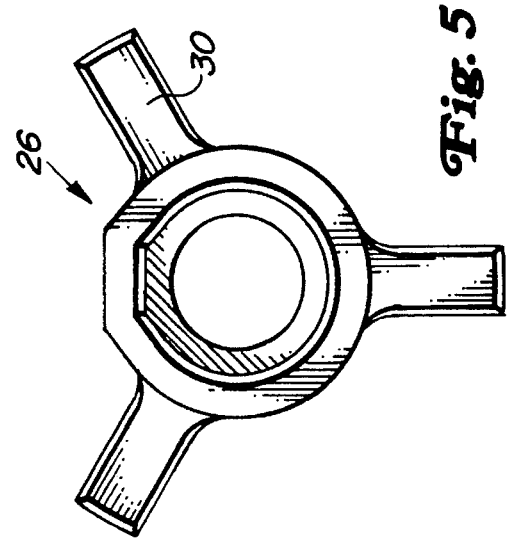

VEHICLE DRIVE WHEEL

BACKGROUND OF THE INVENTION

1) Field of the Invention

The present invention relates to drive wheels used on vehicles and particularly to plastic wheels used for driving vehicles such as lawn and garden tractors and rear engine riders.

2) Related Art

Walk behind lawn mowers have long used plastic wheels due their low cost and light weight. In some applications, the plastic wheels serve as drive wheels. Some plastic drive wheels have been bolted to hubs that are driven by transmission axles.

Others have been mounted on axles and provided with gear teeth that are in turn powered by transmission driven axles provided with a pinion fixed to their end portion. The gear teeth can either be carried on the inside periphery of the wheel or on a gear mounted co-axially with the wheel to engage the axle pinion. Both plastic and metal gears have been used in combination with such plastic drive wheels.

Plastic wheels used on walk behind lawn mowers are typically much smaller than the wheels which would be required on larger vehicles such as lawn and garden tractors or rear engine riders. To simply enlarge plastic lawn mower wheels for use on the larger vehicles could present problems.

For example, to power large vehicle drive wheels through the use of teeth on the inside face of the wheel would allow only the outside face of the wheel to be used to support the weight of the vehicle. Since larger vehicles weigh more, support drivers and often carry or support attachments, the use of only the outside face of the wheel for support would not be desirable.

Further, plastic drive teeth incorporated into the inside face of a drive wheel used on larger vehicles, whether molded into the inside periphery or carried on a co-axially mounted plastic gear, could result in rapid or premature wear due to the higher torque requirements found with heavier vehicles.

One approach which has been used to inhibit wear and/or premature failure of drive teeth has used a metal gear mounted on the inside face of the plastic wheel. While metal gears can be expected to wear much better than plastic gears, their cost can be high. Further, they increase vehicle weight and present additional expense for assembling them to the drive wheel.

Another approach utilizes metal wheels and metal gear teeth. While these wheels and gears would provide sufficient strength and wear life for larger vehicles, their cost and weight are prohibitive.

An additional problem encountered when adapting plastic wheels for use with larger vehicles relates to the torque levels that must be transmitted from the transmission axle to the drive wheel. When a pinion is used on the axle to drive the teeth on the wheel, bending forces can be encountered at the end portion of the axle.

Therefore, to avoid rapid wear and/or premature failure of the wheel, it would be desirable to provide a plastic drive wheel usable with larger vehicles that does not require the use of bolts or similar attachment devices to couple it to a hub, nor the use of plastic teeth formed in or attached to it. Further it would be desirable to provide a plastic drive wheel that can support the heavier weight of larger vehicles. Additionally it would be desirable to provide a plastic drive wheel that is not prohibitively expensive to manufacture and/or assemble, is reliable in operation and is adapted to reduce the bending forces transferred to the drive axle with the higher levels of torque expected on heavier vehicles.

BRIEF SUMMARY OF THE INVENTION

The present invention provides a plastic drive wheel for larger vehicles such as lawn and garden tractors and rear-engine riders. The plastic wheel has molded into its center section a two-piece metal insert which is adapted to receive and be rotatably fixed with the drive axle of a vehicle which extends from the vehicle's transmission to the wheel. The insert in the preferred embodiment includes generally equally spaced and radially extending spokes around the circumference of its end portions. Each spoke is angularly offset with respect to the next spoke carried at the other end of the insert. The spokes are molded into the plastic wheel spoke segments with the segments extending from the axle portion of the wheel to its outer rim portion. The offsetting spoke segments carried at both the inside and outside faces of the wheel serve to support the weight of the vehicle.

With the present invention there is provided a plastic drive wheel that is satisfactorily adapted to carry the weight of larger and heavier vehicles, and which is reliable when drivingly rotated by the axle shaft of a typical commercial transmission.

BRIEF DESCRIPTION OF THE DRAWINGS

FIG. 2 is a cut-away view through the center of the wheel, illustrating a portion of the drive axle, the plastic wheel, the insert and the dust cap.

FIG. 3 is a schematic view showing the two portions: of the insert which are press-fit assembled.

FIG. 4 is a view of the insert segment taken along line 4—4 of FIG. 3.

FIG. 5 is a view of the insert portion taken along line 5—5 of FIG. 3.

BRIEF DESCRIPTION OF THE PREFERRED EMBODIMENT

Figure 1:
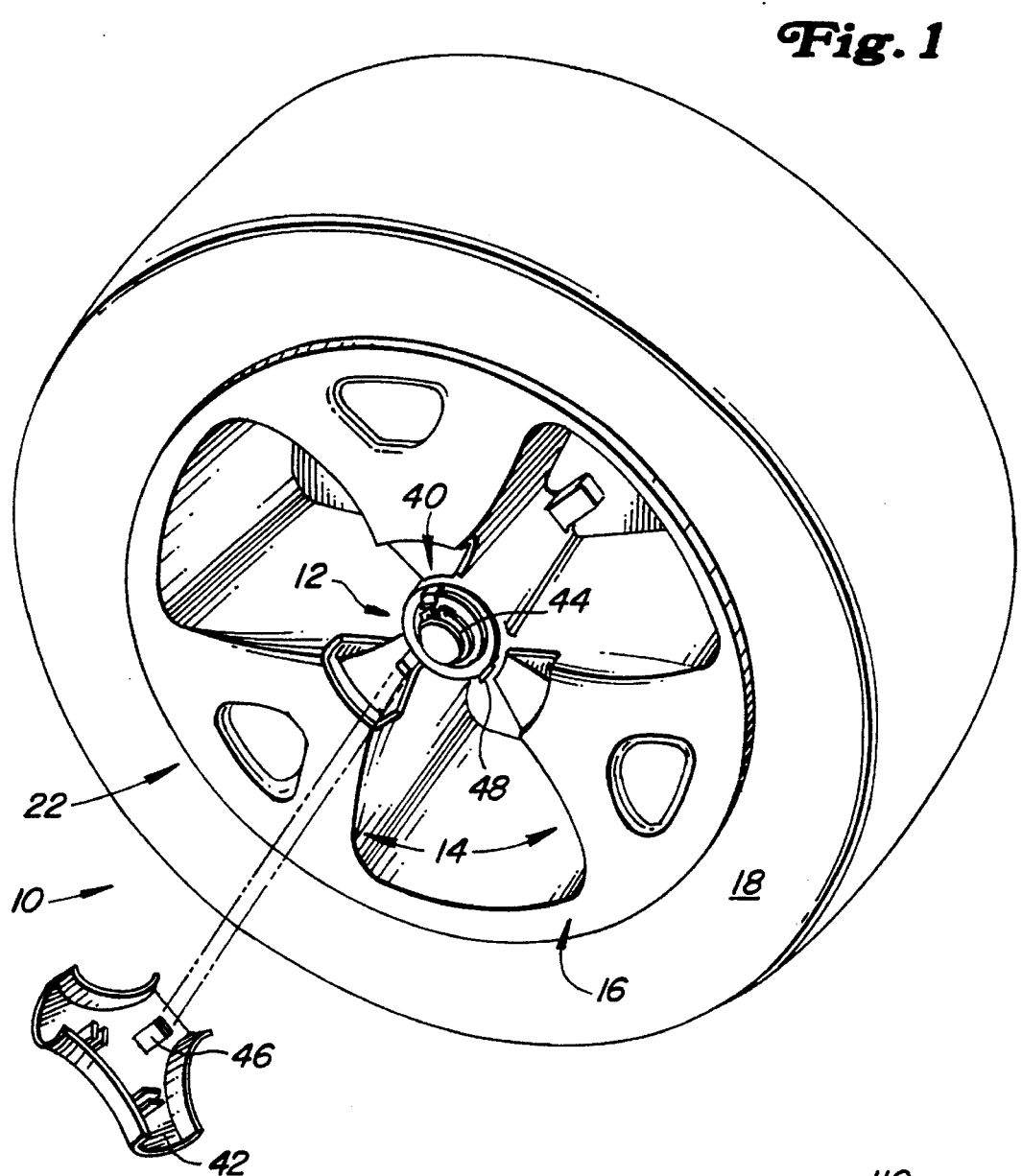
FIG. 1 is an enlarged elevated perspective of a plastic drive wheel and tire, including an optional dust cap.

Looking first to FIG. 1, there is illustrated an elevated perspective view of the plastic composite wheel 10. It includes a plastic central hub portion 12 and spoke segments 14 that extend from the hub portion 12 to a rim portion 16 adapted to receive a tire 18.

Each spoke segment 14, in the preferred embodiment, extends through an arc of approximately 60° with three spoke segments 14 being located on each face or side 20 and 22 of the wheel 10. The spoke segments 14 on opposite sides 20 and 22 of the wheel 10 alternate throughout the circumference of the wheel 10.

Received inside the central hub portion 12 and fixed therein during the molding process, is a two-piece drive insert 24. Looking now to FIGS. 2 and 3, it will be seen that the preferred drive insert 24 consists of inside and outside portions numbered respectively 26 and 28, those portions 26 and 28 preferably being manufactured by a powdered metal process. The two portions 26 and 28 are assembled in a press-fit operation to be fixably locked to one another prior to their placement in a mold. The drive insert portions 26 and 28 each have their respectively radially extending fingers or spokes 30 and 32 placed at generally equa-distant locations about their circumferences. In the preferred embodiment, this radial spacing is 120°. The spokes 30 and 32 on the two insert portions 26 and 28 are assembled to alternate so that one spoke 30 or 32, extends out from the insert 24, when viewed axially, at approximately every 60°. The interior of the drive insert 24, includes a key 34 formed therein to enable it to be fixably received on the transmission axle 36 (see FIG. 2). The insert 24 and axle 36 are rotatably locked through the use of the key 34 formed in the insert portion 28 and the keyway 38 formed in the drive axle 36.

The insert 24 includes on its one end three relatively straight outwardly extending fingers 30, (see FIGS. 3 and 4), that when molded into the wheel 10, project into respective plastic spoke segments 14 on the inside face of the wheel 10. Within each spoke segment 14 carried at the outside face 22 of the wheel 10, an angled metal spoke 32 is carried, (see FIGS. 3 and 4). In the preferred embodiment, the outer spokes 32 are angled and provide a recess 40 in the central or hub portion 12 of the outer face 22 of the wheel to enable a dust cap 42 to be mounted for protecting the axle 36 and insert surfaces from dust and other foreign materials.

A snap ring 44 is provided for securing the axle shaft 36 within the opening of the insert 24, see FIGS. 1 and 2. The dust cap 42 in the preferred embodiment is composed of plastic material and includes small tabs 46 which are receivable on a spring clip 48 that is press-fit assembled onto the hub portion 12 of the wheel 10. One plastic found satisfactory in molding the drive wheel is HIMONT ASTRYN 75F4-2.

Figure 6:
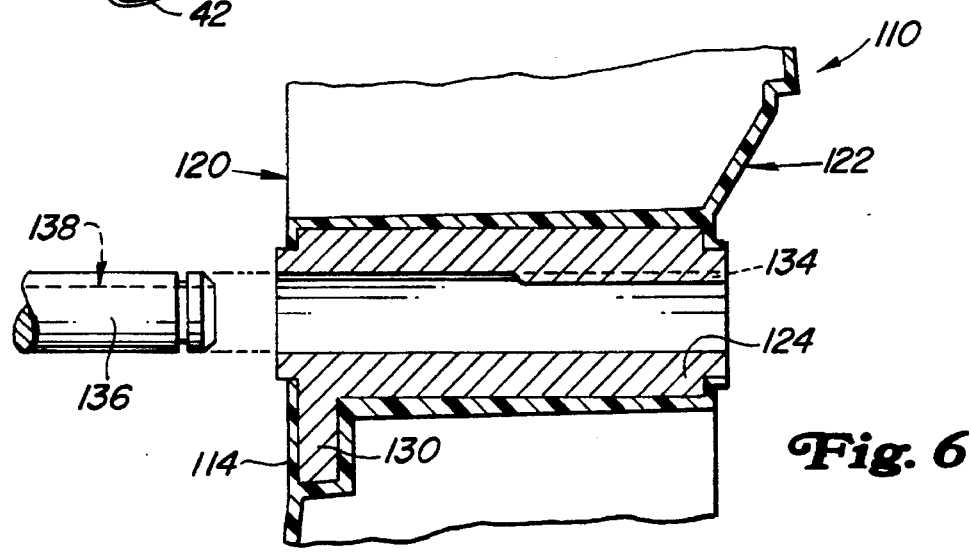
FIG. 6 is a view similar to FIG. 2, but of a modified version of the drive wheel structure including the insert.

Looking now to FIG. 6, there is illustrated a cut-away view of a modified drive wheel structure 110. This wheel 110 includes an insert 124 having only one set of three radially projecting spokes 130, rather than inner and outer spokes. The insert 124 includes three generally straight spokes 130 carried at the inside face 120 of the wheel 110, with the spokes 130 being located at approximately 120° spacings. These spokes 130 are also embedded within plastic spoke segments 114 of the inner face 120 of the wheel 110. No insert spokes are carried at the outer face 122 of the modified wheel structure 110.

As can be seen from the foregoing explanation, there is provided an easily manufactured and reliable plastic drive wheel constructed to support heavier vehicles such as lawn and garden tractors and rear engine riders, the wheel structure also being capable of reliably transmitting the torque necessary without the use of bolts or gear teeth that can be subject of rapid wear and/or premature failure.

I claim:

1. A plastic composite drive wheel usable with vehicles having a power source coupled with at least one drive axle, the wheel including:

a central hub portion;

a rim portion adapted to receive a tire;

spoke segments extending from the hub portion to the rim portion, and a drive insert received within the hub portion, the insert being fixed within the wheel and including an opening adapted to receive the drive axle, the insert further having radially extending spokes extending from the hub portion and into the spoke segments of the wheel for transmitting torque from the drive axle and into the spoke segments.

2. The invention defined in claim 1 wherein the hub and rim portions, as well as the spoke segments are composed of composite material and the insert is comprised of metal.

3. The invention defined in claim 1 wherein there are at least three spoke segments extending from the hub portion to the rim portion, the segments being generally equally angularly 4. A composite drive wheel usable with vehicles having a power source coupled with at least one drive axle, the wheel including:

a central hub portion;

a rim portion adapted to receive a tire;

a first inside face portion and a second outside face portion extending between the hub portion and rim portion; inside and outside spoke segments carried respectively in the inside and outside face portions and extending from the hub portion to the rim portion, the inside and outside segments radially alternating around the circumference of the wheel; and a drive insert received within the hub portion, the insert being fixed within the wheel and including an opening adapted to receive the drive axle, the insert further having radially extending spokes extending from the hub portion and into the alternating spoke segments for transmitting torque from the drive axle and into the spoke segments.

5. The invention defined in claim 4 wherein the hub, rim and face portions are composed of plastic and the insert is composed of metal.

6. The invention defined in claim 5 wherein the insert is composed of powdered metal.

7. The invention defined in claim 5 wherein the there are three inside and three outside spoke segments and the insert includes radially extending drive spokes extending into the spoke segments.

8. The invention defined in claim 7 wherein the inside spokes extend generally radially from an axis through an axle opening extending through the insert, while the outside spokes extend generally radially and slightly axially from said axis.

9. The invention defined in claim 8 wherein the outside face portion is adapted to receive a structure for covering the end portion of the drive axle when it is received within the insert opening.

10. The invention defined in claim 4 wherein the insert is comprised of an inside and outside portion, said portions being capable of being press-fit together.

11. The invention defined in claim 4 wherein there is provided means for rotatably fixing the axle and insert together.

\* \* \* \* \*

UNITED STATES PATENT AND TRADEMARK OFFICE
CERTIFICATE OF CORRECTION

PATENT NO. : 5,494,338
DATED : 27 February 1996
INVENTOR(S) : Terry Dean Hardesty et al.

It is certified that error appears in the above-indentified patent and that said Letters Patent is hereby corrected as shown below:

Column 4, line 14, after "angularly" insert --spaced around the circumference of the wheel.--

Signed and Sealed this

Tenth Day of September, 1996

Attest:

BRUCE LEHMAN

Attesting Officer

Commissioner of Patents and Trademarks